United States Patent [19]
Ieda

[11] Patent Number: 5,847,371
[45] Date of Patent: Dec. 8, 1998

[54] IC CARD DEVICE

[75] Inventor: Tomoaki Ieda, Neyagawa, Japan

[73] Assignee: Matsushita Electric Industrial Co., Ltd., Osaka, Japan

[21] Appl. No.: 776,482

[22] PCT Filed: May 30, 1996

[86] PCT No.: PCT/JP96/01473

§ 371 Date: Apr. 10, 1997

§ 102(e) Date: Apr. 10, 1997

[87] PCT Pub. No.: WO96/38811

PCT Pub. Date: Dec. 5, 1996

[30] Foreign Application Priority Data

May 31, 1995 [JP] Japan .................................. 7-133329

[51] Int. Cl.$^6$ .................................................. G06K 7/06
[52] U.S. Cl. ............................................ 235/441; 235/482
[58] Field of Search ..................................... 235/441, 482

[56] References Cited

U.S. PATENT DOCUMENTS 5,202,551  4/1993  Parrer et al. ............................ 235/441

FOREIGN PATENT DOCUMENTS

| 62-129664 | 8/1987 | Japan . |
| 63-244187 | 10/1988 | Japan . |
| 2-123482 | 5/1990 | Japan . |
| 3-30167 | 3/1991 | Japan . |

*Primary Examiner*—Harold Pitts
*Attorney, Agent, or Firm*—Panitch Schwarze Jacobs & Nadel P.C.

[57] ABSTRACT

An electromagnetic solenoid 4 of a holding type is used to drive a discharge-deterring member 3, the discharge-deterring member 3 is fixed by the electromagnetic solenoid 4 before insertion of an IC card 40, but in a state after a card detector 7 detects the insertion of the IC card 40, the electromagnetic solenoid 4 allows the discharge-deterring member 3 to operate, so that a card discharging member 2 is deterred from operating.

8 Claims, 11 Drawing Sheets

A →

IC CARD DEVICE

TECHNICAL FIELD

The present invention relates to an IC card device which holds an IC card which stores data such as personal information in fields of communication, finance, medical care and the like.

BACKGROUND ART

An IC card comprises a card-shaped or card-like plate and an integrated circuit which is buried in the plate. The integrated circuit includes a microprocessor unit and a memory, and is formed on a one-chip of a semiconductor chip. In recent years, the IC card is widely put into practical use in the fields of communication, finance, medical care and the like, because the IC card has superior features about multifunction and security for stored data in the memory. For example, in the communication field, the IC card is used as a prepaid card for a public telephone, a user identification card for a portable telephone, etc. As the IC card has become popular in such a manner, installation of equipment such as public telephone machines and cash dispensers which incorporate an IC card device for holding the IC card and for reading data is becoming popular.

In the following, a description will be given on a conventional IC card device which is described in Japanese Patent Application Laid-Open Gazette No. 63-244187, for instance, with reference to FIGS. 15, 16 and 17.

FIG. 15 is a plan view showing a state before an IC card is inserted in conventional IC card. FIG. 16 is a plan view showing a state after the IC card is inserted in the conventional IC card device shown in FIG. 15. FIG. 17 is a cross sectional view taken on line XVII—XVII in FIG. 16. In FIG. 17, however, for simplicity of illustration, springs 70, 71 are omitted.

As shown in FIGS. 15, 16 and 17, a conventional IC card device 51 includes a first card discharging member 52 which is moved in an insertion direction X of an IC card 50 as the IC card 50 is inserted, having an L-shaped portion 52a which contacts a tip portion of the IC card 50 to be inserted, a second card discharging member 53 which is linked to the first card discharging member 52 by pins 61, 62 and which can be moved in the insertion direction X as the first card discharging member 52 is moved, a discharge-deterring member 54 which is linked to the second card discharging member 53 by an axis 63 and which can be rotated about the axis 63, and a card holding member 55 which is linked to the second card discharging member 53 by an axis 64 and which can be rotated about an axis 65. A hook portion 54a is formed at one end of the discharge-deterring member 54. When the IC card 50 is inserted at a predetermined position within the IC card device 51 (hereinafter referred to as "reading position"), the hook portion 54a is engaged with a notched portion 53a of the second card discharging member 53, so that the second card discharging member 53 is locked. Further, when the IC card 50 is inserted at the reading position, a bent portion 55a formed at one end of the card holding member 55 latches a rear edge of the IC card 50 within the IC card device 51, to thereby block a discharging path for discharging the IC card 50. Thereby, it is possible to prevent the IC card 50 from getting discharged during the insertion of the IC card 50.

Further, the IC card device 51 comprises an electromagnetic solenoid 56, which is linked with the discharge-deterring member 54 for discharging the IC card 50 which is inserted as an electric signal (hereinafter "discharge signal") is received from a control device not shown. A bent portion 54b formed at the other end of the discharge-deterring member 54 is linked with a plunger 56a of the electromagnetic solenoid 56 through a spring 73.

The IC card device 51 comprises a contact holding plate 57 which includes a plurality of contact terminals 57a and which is rotated about an axis 66 in association with movement of the first card discharging member 52, and a card rear edge detector 58 which detects the insertion of the IC card 50 at the reading position based on the movement of the first card discharging member 52.

Next, an operation of the conventional IC card device 51 will be described. As the IC card 50 is inserted into the IC card device 51, a front edge of the IC card 50 contacts the L-shaped portion 52a, whereby the first card discharging member 52 is moved in the insertion direction X of the IC card 50 against the urging force of the spring 71. As the IC card 50 is further inserted, the first card discharging member 52 contacts the second card discharging member 53 and moves the second card discharging member 53 in the insertion direction X against the urging force of the spring 70. When the IC card 50 is inserted at the reading position, the discharge-deterring member 54 is rotated in the clockwise direction about the axis 63, so that the hook portion 54a is engaged with the notched portion 53a to lock the second card discharging member 53. Further, at the same time, the card holding member 55 is rotated in the counter-clockwise direction about the axis 65, so that the bent portion 55a blocks the discharging path for discharging the IC card 50 and latches the IC card 50. Furthermore, a cam portion 52b formed in the first card discharging member 52 rotates the contact holding plate 57 in the counter-clockwise direction about the axis 66, whereby transaction of data is made possible since the plurality of contact terminals 57a contact plural contacts (not shown) formed on a surface of the IC card 50.

Now, in the case of discharging the IC card 50 from the IC card device 51, the discharge signal is supplied to the electromagnetic solenoid 56 from the external control device to move the plunger 56a of the electromagnetic solenoid 56 in the insertion direction X. Thereby, the discharge-deterring member 54 is rotated in the counter-clockwise direction, so that engagement of the notched portion 53a and the hook portion 54a is released. As a result, returning force (contracting force) of the springs 70 and 71 moves the first and the second card discharging members 52 and 53 in an opposite direction to the insertion direction X, so that the IC card 50 is discharged outside the IC card device 51. Further, at this stage, since the card holding member 55 is rotated in the clockwise direction, the IC card 50 is discharged without being blocked by the bent portion 55a. In addition, since the contact points holding plate 57 is rotated in the clockwise direction due to the returning force of the spring 72, the contact point terminals 57a leave the contacts of the IC card 50, and therefore, the IC card 50 is discharged smoothly.

In the conventional IC card device 51 as described above, even in the case where it is impossible to supply the discharge signal to the electromagnetic solenoid 56 because of power failure or a system abnormality in equipment, the bent portion 55a of the card holding member 55 mechanically latches the rear edge of the IC card 50. Thereby, there is a problem that it is impossible to easily discharge the IC card 50 from the IC card device 51. When the above-mentioned conventional IC card device 51 is incorporated in a public telephone machine, for instance, if a user inserts the IC card 50 by mistake into a public telephone machine which is out of use due to the power failure, the IC card 50 is held and latched within the IC card device 51 and it becomes impossible to take out the IC card 50. Therefore, even if the IC card 50 still has a considerable number of usable points, a user cannot easily pulls out the IC card 50.

Furthermore, when it becomes impossible to supply the discharge signal to the electromagnetic solenoid 56 because of the power failure or the like while the IC card 50 is inserted and used, the IC card 50 is left latched within the IC card device 51, and the user cannot easily pulls out the IC card 50.

SUMMARY OF THE INVENTION

The present invention aims at providing for an IC card device which does not cause latching of an IC card and therefore allows discharging of the IC card even in the case that it is impossible to supply a discharge signal to an electromagnetic solenoid 56 because of power failure or a system abnormality.

An IC card device according to the present invention comprises:

card discharging means for discharging an IC card;

discharge-deterring means for deterring a discharging operation of discharging said IC card which is performed by said card discharging means, when supplied with a first current;

holding means for holding the inserted IC card at an insertion complete position when said discharging operation of discharging said IC card which is performed by said card discharging means is prohibited; and connection means which is electrically connected to a contact point of said IC card.

According to such a structure, in a normal condition where said first current is supplied, when an IC card is inserted, the discharge-deterring means deters the discharging operation of the IC card which is performed by the card discharging means, and the holding means can hold the IC card so that the IC card will not be pulled out by mistake during an operation of the IC card device. Further, even when it is impossible to supply the first current because of the power failure, a system abnormality or the like, the discharge-deterring means does not deter the discharging operation of the IC card which is performed by the card discharging means, so that the IC card is automatically discharged by the discharging means. As a result, a user can easily draw the IC card.

An IC card device according to other aspect of the present invention comprises:

a power source for supplying electric power to the discharging means;

storage means for storing electric power;

power failure detecting means for detecting that said power source stops supplying; and energizing controlling means for providing said discharge-deterring means with said electric power which is stored in said storage means, when said power failure detecting means detects that said power source stops supplying.

According to such a structure, even in the case of an abnormal condition such as the power failure during insertion of the IC card, the energizing controlling means provides the discharge-deterring means with the electric power of the storage means, and therefore, it is possible to discharge the IC card.

An IC card device according to still other aspect of the present invention comprises:

a card discharging member which is moved in an insertion direction of an IC card together with said IC card;

a discharge-deterring member which deters an operation of said card discharging member when said IC card arrives at an insertion complete position;

a connection member which is electrically connected to a contact of said IC card when said IC card arrives at the insertion complete position;

a card holding member which is revolved in association with said card discharging member to hold a rear edge of said IC card which is inserted; and a cam mechanism which revolves said card discharging member against said card holding member and said card discharging member.

According to such a structure, with a simple structure, it is possible to realize a mechanism for latching the IC card.

While the novel features of the invention are set forth particularly in the appended claims, both as to organization and content, will be better understood and appreciated, along with other objects and features thereof, from the following detailed description taken in conjunction with the drawings.

BRIEF DESCRIPTION OF DRAWINGS

FIG. 7(*b*) is a cross sectional view along an axial direction of an electromagnetic solenoid which is used in the IC card device shown in FIG. 1, showing other example of a structure of the electromagnetic solenoid.

DESCRIPTION OF THE PREFERRED EMBODIMENTS

In the following, preferred embodiments of the present invention will be described with reference to the drawings.

First Embodiment

Figure 1:
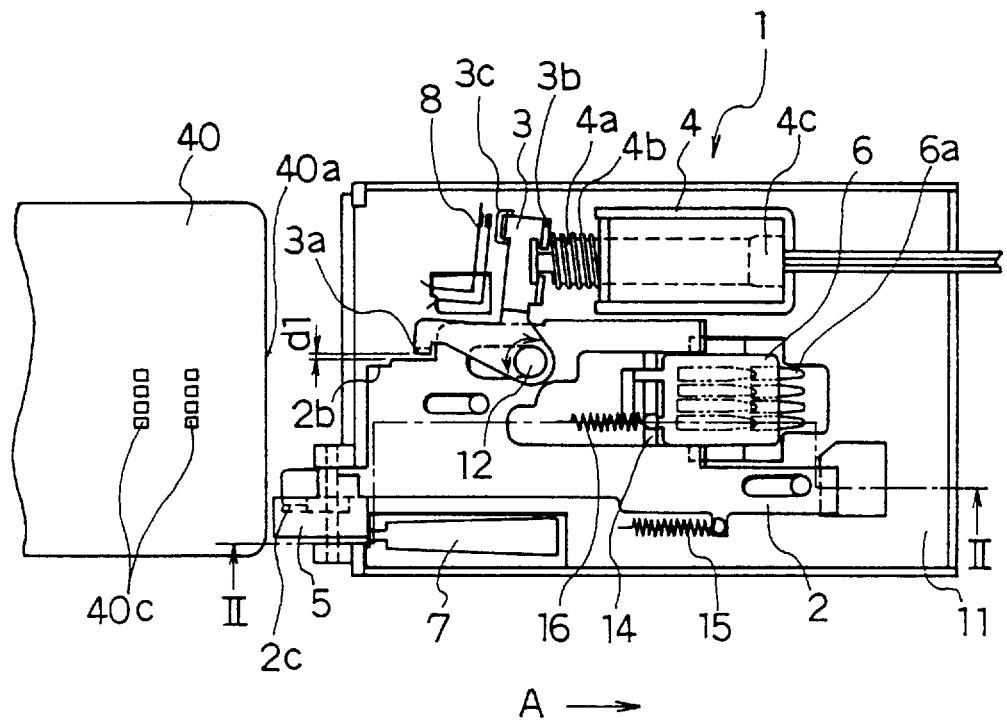
FIG. 1 is a plan view showing a state before an IC card is inserted in an IC card device of a first embodiment of the present invention.
Figure 2:
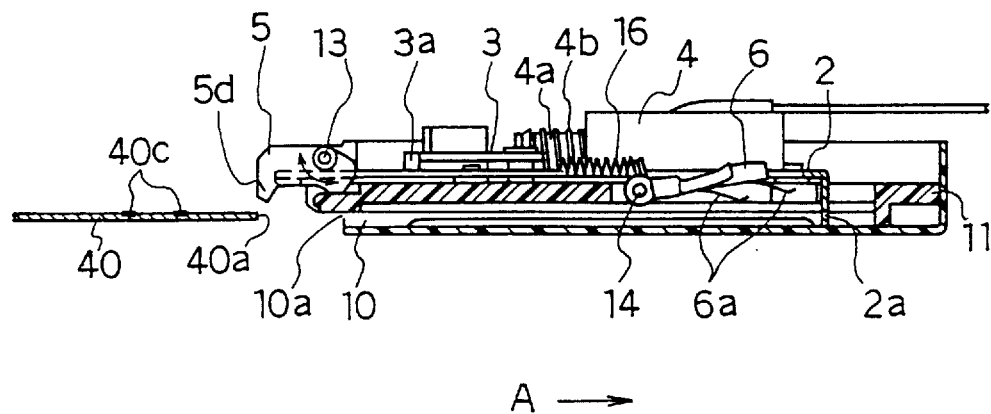
FIG. 2 is a cross sectional view taken on line II—II in FIG. 1.
Figure 3:
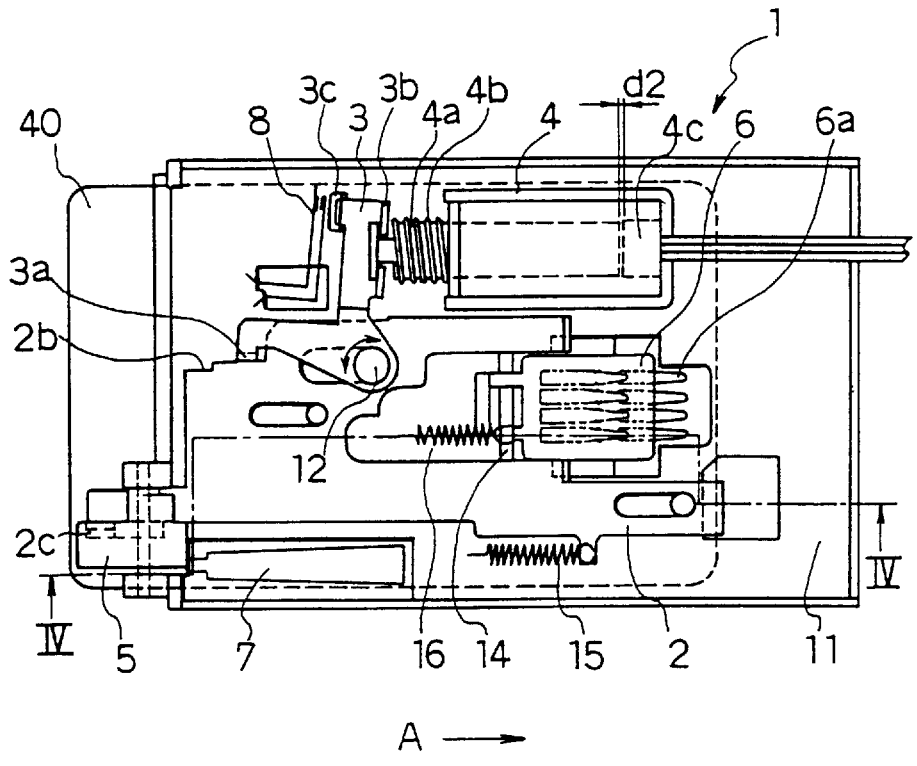
FIG. 3 is a plan view showing a state while the IC card is inserted in the IC card device shown in FIG. 1.
Figure 4:
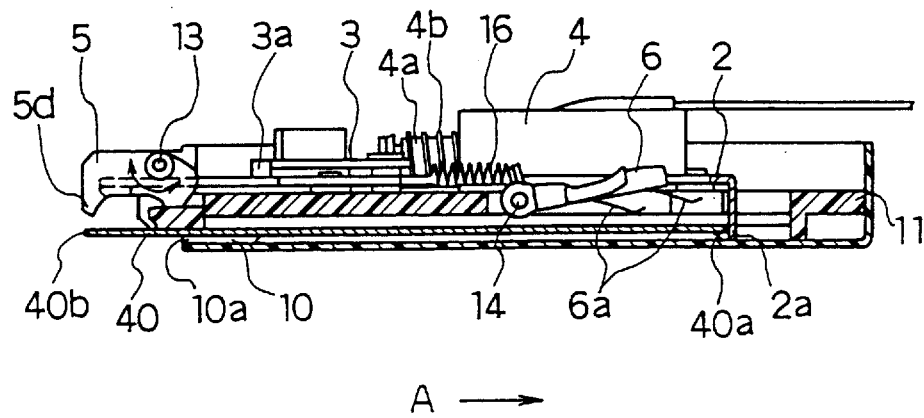
FIG. 4 is a cross sectional view taken on line IV—IV in FIG. 3.
Figure 5:
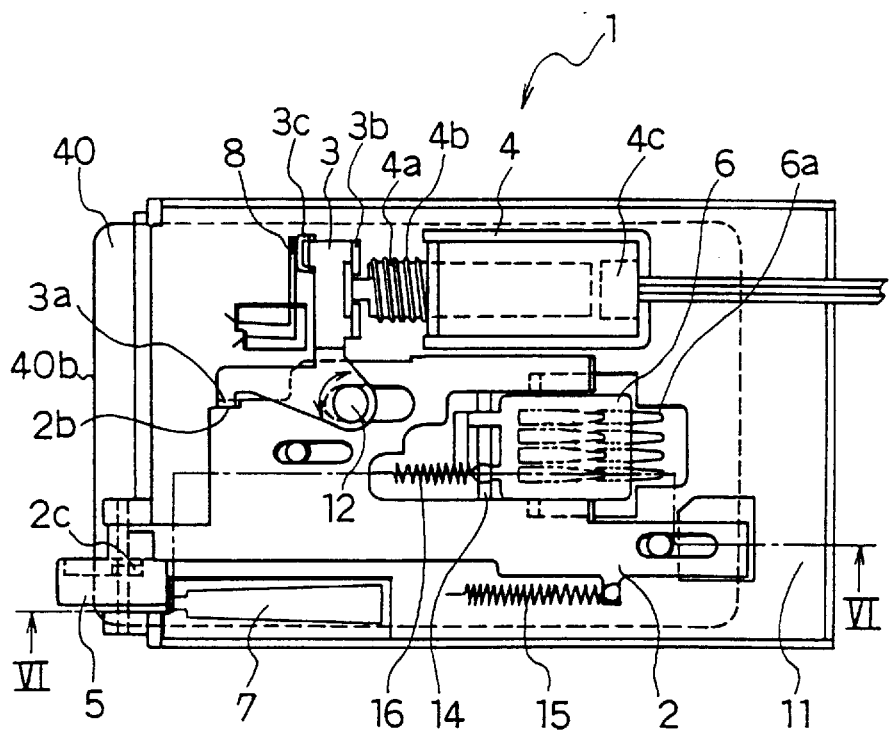
FIG. 5 is a plan view showing a state after the IC is inserted in the IC card device shown in FIG. 1.
Figure 6:
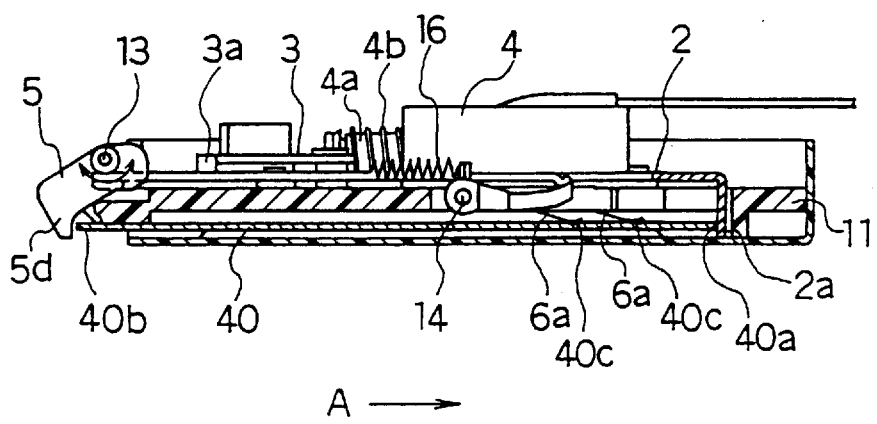
FIG. 6 is a cross sectional view taken on line VI—VI in FIG. 5.

FIG. 1 is a plan view showing a state before an IC card is inserted in an IC card device of a first embodiment of the present invention, and FIG. 2 is a cross sectional view taken on line II—II in FIG. 1. FIG. 3 is a plan view showing a state while the IC card is inserted in the IC card device shown in FIG. 1, and FIG. 4 is a cross sectional view taken on line IV—IV in FIG. 3. FIG. 5 is a plan view showing a state after the IC card is inserted in the IC card device shown in FIG. 1, and FIG. 6 is a cross sectional view taken on line VI—VI in FIG. 5.

As shown in FIGS. 1 to 6, in the IC card device 1 of this embodiment, an insertion chamber 10 for an IC card 40 to be inserted is formed. The IC card 40 is inserted at an insertion opening 10a of the insertion chamber 10 in an insertion direction which is indicated by an arrow "A" in the drawing, by a hand of a user or the like, and is then held at a reading position which is an insertion complete position within the insertion chamber 10. The insertion chamber 10 is partitioned into a bottom surface of an outer case of the IC card device 1 and a mounting base 11 which fixedly seats a card discharging member 2 or the like which will be described later.

Further, the IC card device 1 of this embodiment comprises an L-shaped IC card contacting portion 2a which contacts a front edge 40a of the IC card 40 which is inserted. The device further comprises the card discharging member 2 which is moved in the insertion direction A of the IC card 40 as the IC card 40 is inserted in the insertion direction A, a discharge-deterring member 3 which is axially supported for free rotation about an axis 12 and which deters an operation of the card discharging member 2 when the IC card 40 is inserted at the reading position, a self-holding electromagnetic solenoid 4 which drives the discharge-deterring member 3 during discharging of the IC card 40, and a card holding member 5 which is axially supported for free rotation about an axis 13, and which holds a rear edge 40b of the IC card 40 when the IC card 40 is inserted at the reading position. The card discharging member 2 includes a notched portion 2b which is engaged with a latch pawl 3a formed in the discharge-deterring member 3 when the IC card 40 is inserted at the reading position. The card discharging member 2 includes a projecting portion 2c formed on the insertion opening 10a side. The projecting portion 2c contacts a third step portion 5c of the card holding member 5 and rotates the card holding member 5, when the IC card 40 is inserted at the reading position. Due to this, a latch pawl portion 5d of the card holding member 5 blocks up the insertion opening 10a, thereby preventing discharging of the IC card 40 (described in detail later).

The discharge-deterring member 3 and the electromagnetic solenoid 4 are linked to each other by engaging an engaging portion 3b formed in the discharge-deterring member 3 with a plunger 4a of the electromagnetic solenoid 4. Around the plunger 4a, a compression spring 4b is disposed to press a bent portion 3b and the plunger 4a in an opposite direction to the insertion direction A.

The IC card device 1 comprises a contact holding plate 6 which holds plural contact terminals 6a' and which is rotated about an axis 14 in association with movement of the card discharging member 2. When the IC card 40 is inserted at the reading position, the contact terminals 6a are electrically connected with contacts 40c formed on a surface of the IC card 40. The contacts 40c are arranged in accordance with the standards, such as ISO 7816, regarding an IC card.

A card detector 7 is disposed in the vicinity of the insertion opening 10a of the insertion chamber 10, to detect the insertion of the IC card 40 in the insertion chamber 10. The card detector 7 is formed by an optical sensor such as a photocoupler. Furthermore, a latch detector 8 is disposed to detect the insertion of the IC card 40 at the reading position. The latch detector 8 is formed by a leaf switch which uses two contact springs, for example; upon abutting a press portion 3c formed in the discharge-deterring member 3, the contact is turned on or off. Output signals from the card detector 7 and the latch detector 8 are supplied to a control device (not shown) which is externally disposed.

Apart from the above mentioned explanation, wherein the engaging portion 3b and the plunger 4a are engaged with each other, an alternative construction may be such that a member which integrates the discharge-deterring member 3 and the plunger 4a with each other may be used.

The self-holding electromagnetic solenoid 4 which is used in this embodiment will be described in more detail with reference to (a) of FIG. 7.

Figure 7A:
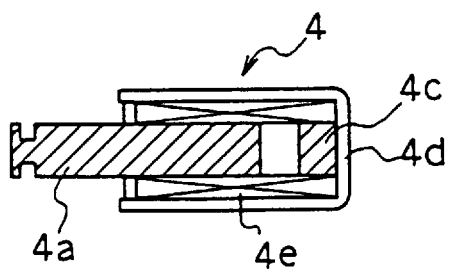
FIG. 7(*a*) is a cross sectional view along an axial direction of an electromagnetic solenoid which is used in the IC card device shown in FIG. 1, showing an example of a structure of the electromagnetic solenoid.
Figure 7B:
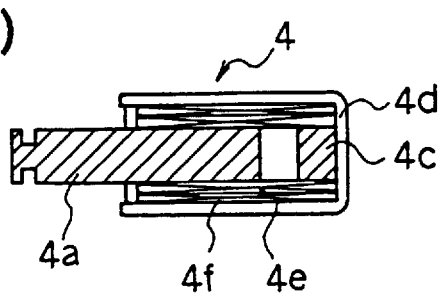

(a) of FIG. 7 is a cross sectional view along an axial direction of the electromagnetic solenoid which is used in the IC card device shown in FIG. 1, showing an example of a structure of the electromagnetic solenoid. In (a) of FIG. 7, for simplicity of illustration, the compression spring 4b is omitted.

As shown in (a) of FIG. 7, in the electromagnetic solenoid 4, the plunger 4a, a magnet 4c and a cylindrical first electromagnetic coil 4e are contained within a case 4d. The magnet 4c is arranged so that a magnetic axis of the magnet 4c is approximately coaxial with an axil of the plunger 4a.

When the plunger 4a is to be sucked into the case 4d, a current is supplied from an external control device so that the current flows through the first electromagnetic coil 4e. In this case, the direction of the current is selected so that the direction of magnetic force created by the first electromagnetic coil 4e coincides with the direction of magnetic force of the magnet 4c for strengthening the magnetic force. Hence, due to the magnetic force of the magnet 4c and the first electromagnetic coil 4e, the plunger 4a is sucked in against returning force of the compression spring 4b (FIG. 1). After sucked in, the plunger 4a is adhered to the magnet 4c almost air-tight. This sufficiently increases the suction force of the magnet 4c' so that the plunger 4a remains sucked toward the magnet 4c, against returning force of the compression spring 4b even if supply of the current is blocked.

In the case that the suction of the plunger 4a is released, the first electromagnetic coil 4e is provided with a current of an opposite direction to the supplied current which is supplied for sucking. This allows the first electromagnetic coil 4e to develop magnetic force of an opposite direction to that of the magnet 4c. Hence, the suction force which acts upon the plunger 4a is weakened, and the plunger 4a is pulled out outside the case 4d due to the returning force of the compression spring 4b.

Instead of the structure as described above which requires to provide the first electromagnetic coil 4e with current of the opposite direction to the supplied current for the purpose of releasing the suction of the plunger 4a, other structure as that shown in (b) of FIG. 7 may be used. That is, a structure in which a cylindrical second electromagnetic coil 4f is disposed coaxially with the first electromagnetic coil 4e, and in which the second electromagnetic coil 4f is provided with a current of a direction which creates magnetic force of an opposite direction to that of the magnet 4c when the suction of the plunger 4a is to be released.

Next, operations of the IC card device 1 of this embodiment will be described.

Figure 8:
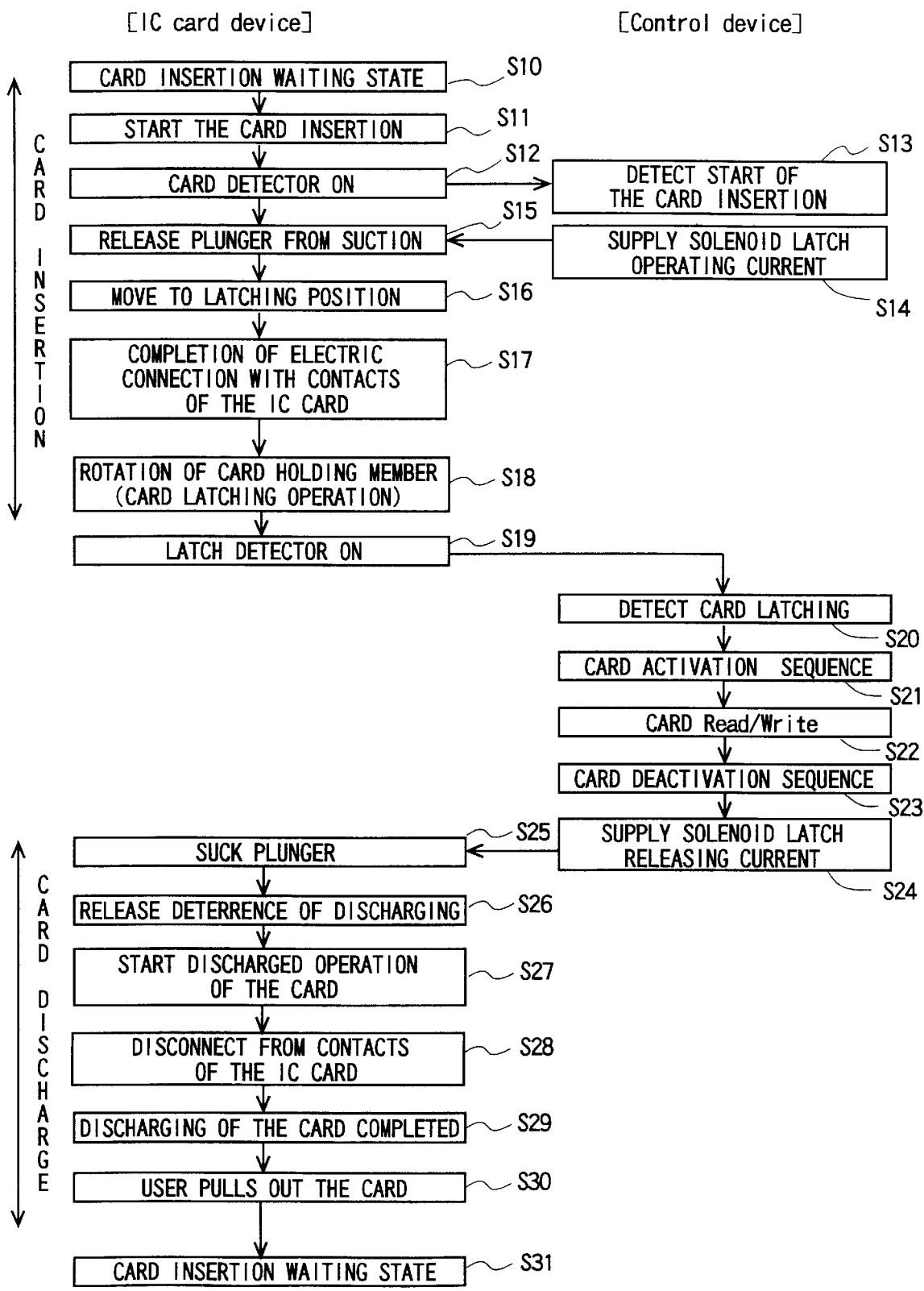
FIG. 8 is a flowchart diagram showing an operation/manipulation sequence in a normal condition of the IC card device shown in FIG. 1.
Figure 9:
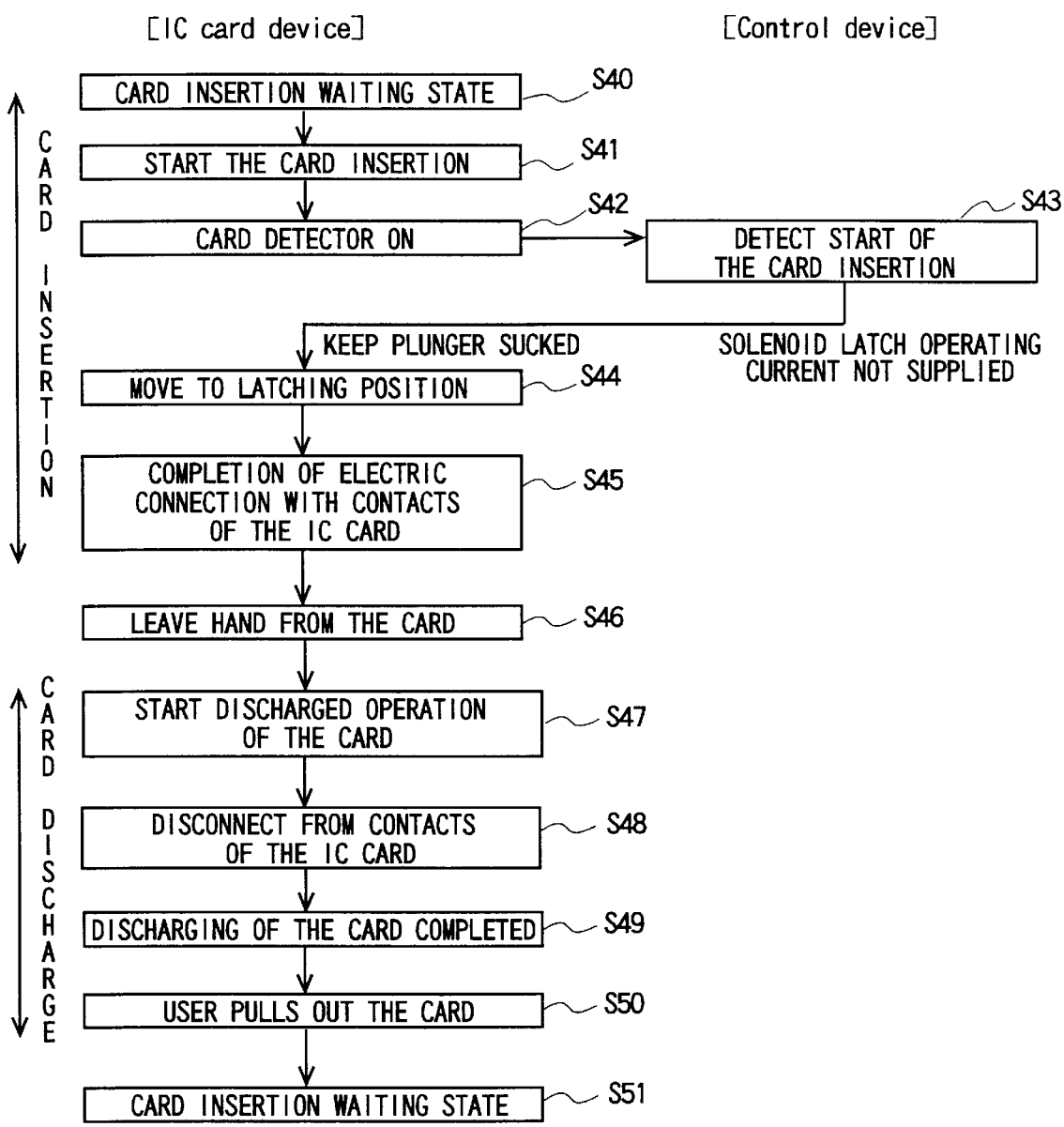
FIG. 9 is a flowchart diagram showing an operation/manipulation sequence in a condition where it is impossible to supply a current to an electromagnetic solenoid within the IC card device shown in FIG. 1.

Operations of the IC card device 1 and a control device (not shown) which controls the IC card device 1 are generally divided into (i) a normal condition where it is possible to supply a current to the electromagnetic solenoid 4' and (ii) an abnormal condition where it is impossible to supply a current, as shown in the flowchart diagrams of in FIGS. 8 and 9, respectively. The abnormal condition where it is impossible to supply a current to the electromagnetic solenoid 4 is caused by the power failure, a system abnormality of the control device, etc.

In a state where the IC card 40 is yet to be inserted, as shown in FIGS. 1 and 2, the plunger 4a of the electromagnetic solenoid 4 remains sucked (S10 in FIG. 8, S40 in FIG. 9). At this stage, the plunger 4a of the electromagnetic solenoid 4 is adhered to the magnet 4c almost air-tight, and there is a gap d1 (FIG. 1) of 0.3 mm, for instance, between the latch pawl 3a of the discharge-deterring member 3 and the card discharging member 2. Meanwhile, the electromagnetic solenoid 4 is of the self-holding type. Hence, after the current for sucking the plunger 4a (i.e., the current for releasing latching) is supplied, even supply of this current is stopped, due to the magnetic force of the magnet 4c which overcomes the returning force of the above-mentioned compression spring 4b, the plunger 4a is kept sucked against the magnet 4c.

(i) Operation In Normal Condition

As a user starts the insertion of the IC card 40 (S11 in FIG. 8, S41 in FIG. 9), as shown in FIGS. 3 and 4, the card detector 7 enters a detecting state (i.e., ON-state) for detecting the existence of the IC card 40. In this IC card detecting state (S13 in FIG. 8, S43 in FIG. 9), the control device provides the electromagnetic solenoid 4 with a current of a direction which decreases the suction force of the plunger 4a, namely, a solenoid latch operating current (S14 in FIG. 8). As a result, the suction force of the plunger 4a is decreased, and due to the returning force of the compression spring 4b, the plunger 4a is released from the suction state (S15 in FIG. 8). Hence, the discharge-deterring member 3 is rotated for the above-mentioned gap d1 in the counterclockwise direction, and the latch pawl 3a comes into contact with the card discharging member 2. At the same time, a gap d2 of 0.2 mm, for instance, is created between the plunger 4a of the electromagnetic solenoid 4 and the magnet 4c.

Since the gap d2 is created, the suction force of the magnet 4c and the plunger 4a becomes smaller. Hence, even if supply of the current to the electromagnetic solenoid 4 is stopped, the plunger 4a is not sucked against the magnet 4c by the returning force of the compression spring 4b. The solenoid latch operating current may be supplied for a short period of time such as about 100 ms, for instance. In this state, however, since the latch pawl 3a of the discharge-deterring member 3 is not engaged with notched portion 2b of the card discharging member 2, the discharge-deterring member 3 never deters the operation of the card discharging member 2.

In this manner, in the normal condition where it is possible to supply a current to the electromagnetic solenoid 4, there is the gap d2 created between the plunger 4a and the magnet 4c.

(ii) Operation In Abnormal Condition

In the case that the abnormal condition where it is impossible to supply a current to the electromagnetic solenoid 4, the plunger 4a remains sucked against the magnet 4c as shown in FIG. 1.

Instead of the structure as described above which requires to provide the electromagnetic solenoid 4 with the solenoid latch operating current to create the gap d2 between the plunger 4a and the magnet 4c, other structure may be used. That is, a semihard material which can change magnetic force, such as an Alnico-contained magnet, may be used as a magnet 4c', so that the magnetic force which is created by the first electromagnetic coil 4e reduces magnetic force of the magnet 4c', and hence the gap d2 is created between the plunger 4a and the magnet 4c'. In this manner, it is possible to easily set the urging force of the compression spring 4b.

As the user further continues the insertion of the IC card 40, as shown in FIGS. 5 and 6, the front edge 40a of the IC card 40 abuts the IC card contacting portion 2a of the card discharging member 2. As this abutting occurs, overcoming the spring force of the spring 15, that is, while the spring 15 is extended (e.g., urged) in a direction of discharging the IC card 40, the card discharging member 2 is moved in the insertion direction A. As the card discharging member 2 is moved in this manner, the contact holding plate 6 is rotated by a cam mechanism which includes the contact points holding plate 6 and the card discharging member 2, in the clockwise direction about the axis 14. As the IC card 40 arrives at the reading position (S16 in FIG. 8, S44 in FIG. 9), electrical connection between the plural contact terminals 6a and the plural contacts 40c of the IC card 40 becomes possible (S17 in FIG. 8, S45 in FIG. 9).

At the same time, the card holding member 5 is rotated by the cam mechanism which includes the card discharging member 2 and the card holding member 5, in the counterclockwise direction about the axis 13. As a result, the latch pawl portion 5d of the card holding member 5 blocks up the insertion opening 10a, thereby preventing discharging of the IC card 40 (S18 in FIG. 8).

Now, a description will be given on the structure which uses the cam mechanism of the card discharging member 2 and the card holding member 5 to prevent discharging of the IC card 40, with reference to FIGS. 10, 11 and 12.

Figure 10:
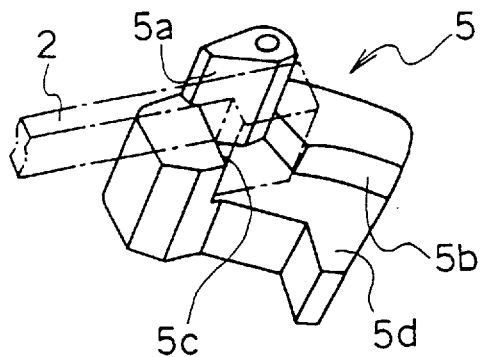
FIG. 10 is a perspective view showing a structure of a card holding member which is used in the IC card device shown in FIG. 1.

FIG. 10 is a perspective view showing a structure of the card holding member which is used in the IC card device shown in FIG. 1. FIG. 11 is an explanatory view showing the card holding member and the card discharging member in the state before the IC card is inserted in the IC card device shown in FIG. 1. FIG. 12 is an explanatory view showing the card holding member and the card discharging member in the state after the IC card is inserted in the IC card device shown in FIG. 1. In FIGS. 10, 11 and 12, the card discharging member 2 and the card holding member 5 are shown as they as looked at from the directly opposite side to that in FIG. 1.

Figure 11:
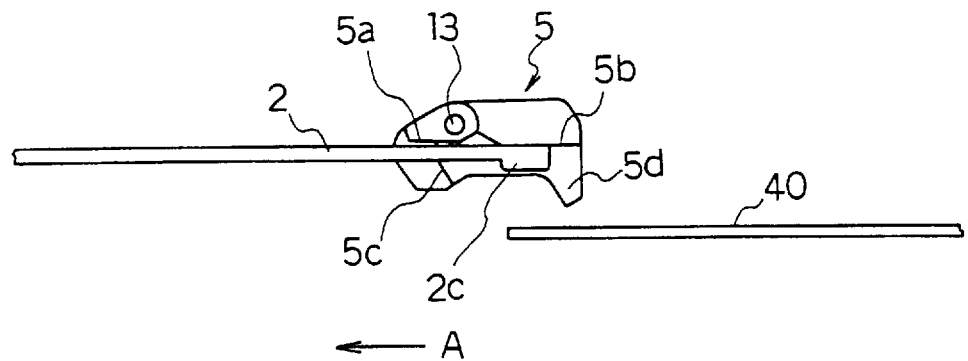
FIG. 11 is an explanatory view showing a card holding member and a card discharging member in the state before the IC card is inserted in the IC card device shown in FIG. 1.
Figure 12:
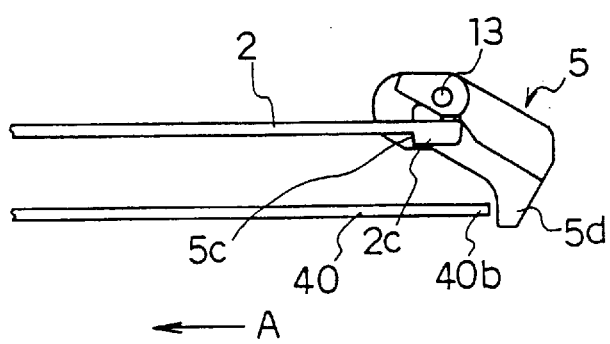
FIG. 12 is an explanatory view showing a card holding member and a card discharging member in the state after the IC card is inserted in the IC card device shown in FIG. 1.

As shown in FIGS. 10, 11 and 12, the card holding member 5 includes a first and a second step portions 5a and 5b formed in parallel with a surface of the card discharging member 2, a third step portion 5c which abuts the projecting portion 2c of the card discharging member 2, and a latch pawl portion 5d which latches rear edge 40b of the IC card 40.

In a state before the card discharging member 2 is moved, as shown in FIG. 11, the second step portion 5b contacts the surface of the card discharging member 2 and prohibits the card holding member 5 from rotating in the clockwise direction. Hence, the card holding member 5 never deters insertion of the IC card 40. When force to rotate the card holding member 5 in the counter-clockwise direction is applied to the card holding member 5, the first step portion 5a contacts the surface of the card discharging member 2 and prohibits the card holding member 5 from rotating.

Next, by the insertion of the IC card 40, the card discharging member 2 is operated. Thereby, in a state which is close to the end of movement of the card discharging member 2, as shown in FIG. 12, the projecting portion 2c of the card discharging member 2 abuts the third step portion 5c of the card holding member 5, and the card discharging member 2 rotates the card holding member 5 in the clockwise direction. As the IC card 40 arrives at the reading position, the card holding member 5 is moved downward, so that the latch pawl portion 5d of the card holding member 5 projects into the insertion opening 10a (FIG. 5), and latches the IC card 40. At this stage, the third step portion 5c (FIG. 10) is parallel with a direction which is approximately perpendicular to the direction in which the card discharging member 2 moves.

In the IC card device 1 of this embodiment, the first, the second and the third step portions 5a, 5b and 5c and the projecting portion 2c of the card discharging member 2 form the cam mechanism. This makes it possible for the card discharging member 2 to rotate the card holding member 5. Thereby, unlike in the conventional IC card device, it is not necessary to link the card discharging member and the card holding member to each other by the axis, and therefore, it is possible to realize the function to latch the IC card 40, with an extremely simple structure.

Referring to FIGS. 5 and 6, as the IC card 40 arrives at the reading position, the latch pawl 3a of the discharge-deterring member 3 is engaged with notched portion 2b of the card discharging member 2. Thereby, the returning force of the compression spring 4b rotates the discharge-deterring member 3 in the counter-clockwise direction, whereby the operation of the card discharging member 2 is deterred. Since the operation of the card discharging member 2 is deterred and since the latch pawl portion 5d of the card holding member 5 projects into the insertion opening 10a, the IC card 40 becomes latched in the IC card device 1, and it becomes impossible to pull out the IC card 40 from the IC card device 1. Thereby, it is possible to prevent a user from pulling out the IC card 40 by mistake.

In this state where the IC card 40 is latched, since the press portion 3c of the discharge-deterring member 3 presses the latch detector 8, the latch detector 8 enters the latching detecting state (i.e., ON-state) (S19 in FIG. 8). After receiving an output signal from the latch detector 8 and confirming the latching detecting state, the control device reads data into the IC card 40 through the contact terminals 6a, writes data and otherwise treats data (S20 to S23 in FIG. 8).

In the abnormal condition where it is impossible to supply a current to the electromagnetic solenoid 4, as has been described in the above, the plunger 4a remains sucked against the magnet 4c. Therefore, the returning force of the compression spring 4b does not rotate the discharge-deterring member 3 in the counter-clockwise direction, and the latch pawl 3a does not engage with notched portion 2b. Thereby, the operation of the card discharging member 2 is not deterred. As a result, when the user inserts the IC card 40 and leaves his hand from the IC card 40 (S46 in FIG. 9), the card discharging member 2 pushes back the IC card 40 in the discharging direction without latching the IC card 40 (S47, S48 in FIG. 9). Accordingly, in the abnormal condition, the user can draw the IC card 40 pushed back from the IC card device 1 (S49 to S51 in FIG. 9).

In this manner, where the IC card device 1 is incorporated in a public telephone machine, for instance, for the purpose of reading and writing in the IC card 40 (i.e., prepaid card), even if the user fails to note the power failure and inserts the IC card 40, the IC card 40 is not latched. Therefore, the user can draw the IC card 40 as it is.

Next, upon communication between the control device and the IC card 40, the control device provides the electromagnetic solenoid 4 with a solenoid latch releasing current which serves as a current for sucking the plunger 4a, for a short period of time such as about 100 ms, for instance (S24 in FIG. 8). Thereby, the plunger 4a is sucked, and the discharge-deterring member 3 is rotated in the clockwise direction (S25, S26 in FIG. 8). Accordingly, the engagement of the latch pawl 3a and the notched portion 2b is released, so that the card discharging member 2 moves the IC card 40 in the discharging direction by the returning force of the spring 15 (S27 in FIG. 8). Further, since the surface of the card discharging member 2 abuts the second step portion 5b (FIG. 11), the card holding member 5 is rotated in the clockwise direction. Further, due to the returning force of the spring 16, the contact holding plate 6 is rotated in the counter-clockwise direction (S28 in FIG. 8). This pushes out the IC card 40 outside the IC card device 1, so that the user can take back the IC card 40 (S29 to S31 in FIG. 8).

As has been described in the above, in the IC card device 1 according to this embodiment, the electromagnetic solenoid 4 is of the self-holding type is used in order to drive the discharge-deterring member 3. Thereby, before the insertion of the IC card 40, the electromagnetic solenoid 4 fixes the discharge-deterring member 3. Meanwhile, after the card detector 7 detects the insertion of the IC card 40, the electromagnetic solenoid 4 makes it possible for the discharge-deterring member 3 to operate, thereby deterring the operation of the card discharging member 2. Hence, in a normal condition where it is possible to energize the electromagnetic solenoid 4, it is possible to latch the IC card 40 so that the IC card 40 is not pulled out while inserted. Further, in an abnormal condition such as the power failure, the system abnormality or the like, since the electromagnetic solenoid 4 is not energized, the discharge-deterring member 3 does not deter the operation of the card discharging member 2. As a result, the IC card 40 is not latched but automatically discharged.

Further, as has been described in the above, the card detector 7 is disposed in the vicinity of the insertion opening 10a, and the electromagnetic solenoid 4 is driven by the output signal from the card detector 7. Thereby, it is possible to normally latch the IC card 40 if the electromagnetic solenoid 4 is driven in a relative long period of time until the IC card 40 arrives at the reading position since the card detector 7 starts operating. This makes it extremely easy to control with the control device.

Further, since the electromagnetic solenoid 4 is of the self-holding type is used, realization of the IC card device 1 which does not latch the IC card 40 during the power failure or the like, and realization of the function of latching the IC card 40 with a simple structure owing to the cam mechanism disposed between the card holding member 5 and the card discharging member 2, can be applied to the IC card device 1 independently of each other.

Figure 15:
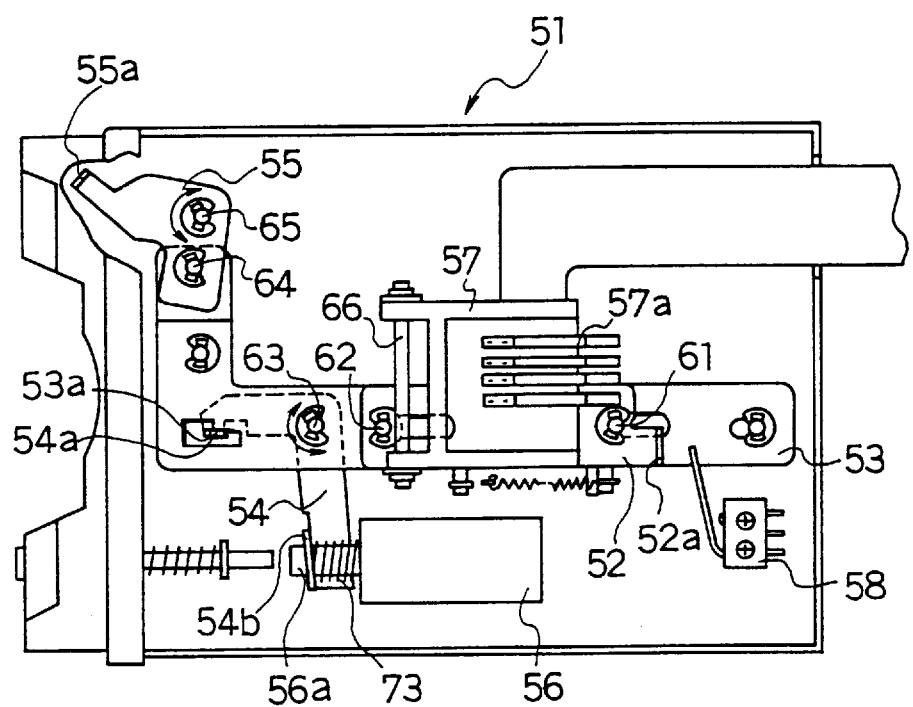
FIG. 15 is a plan view showing a state before an IC card is inserted in a conventional IC card device.
Figure 16:
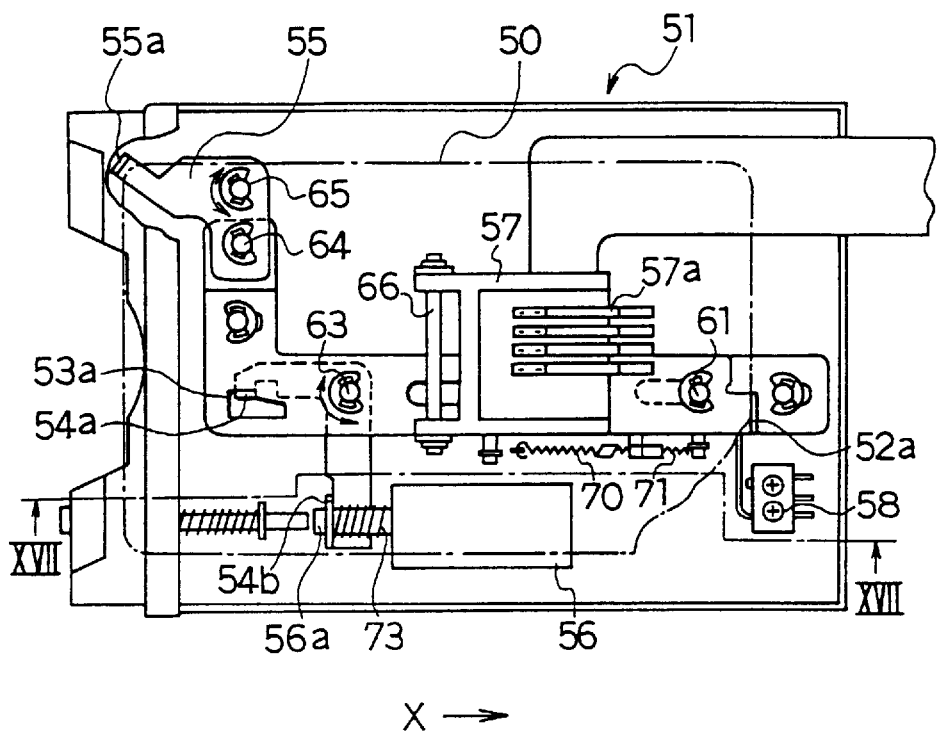
FIG. 16 is a plan view showing a state after the IC card is inserted in the IC card device shown in FIG. 15.
Figure 17:
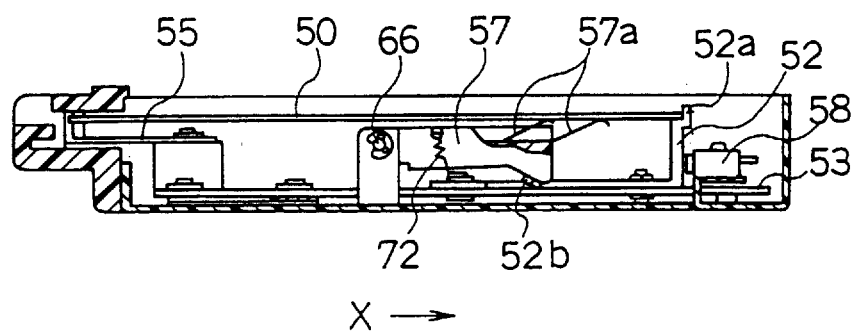
FIG. 17 is a cross sectional view taken on line XVII—XVII in FIG. 16.

For example, the electromagnetic solenoid 56 of the conventional IC card device 51 shown in FIG. 15 may be replaced with an electromagnetic solenoid of the self-holding type. The electromagnetic solenoid of the self-holding type may be energized and the sucked-in condition of the plunger may be released when the card rear edge detector 58 which detects that the IC card 40 arrives at the reading position, whereby an IC card device 1 which does not latch an IC card during the power failure is realized.

Further, the electromagnetic solenoid 4 of this embodiment may be a DC solenoid instead of a self-holding solenoid, and the DC solenoid may be energized only when the IC card 40 is discharged, whereby the function of latching the IC card 40 is realized with a simple structure.

Second Embodiment

Figure 13:
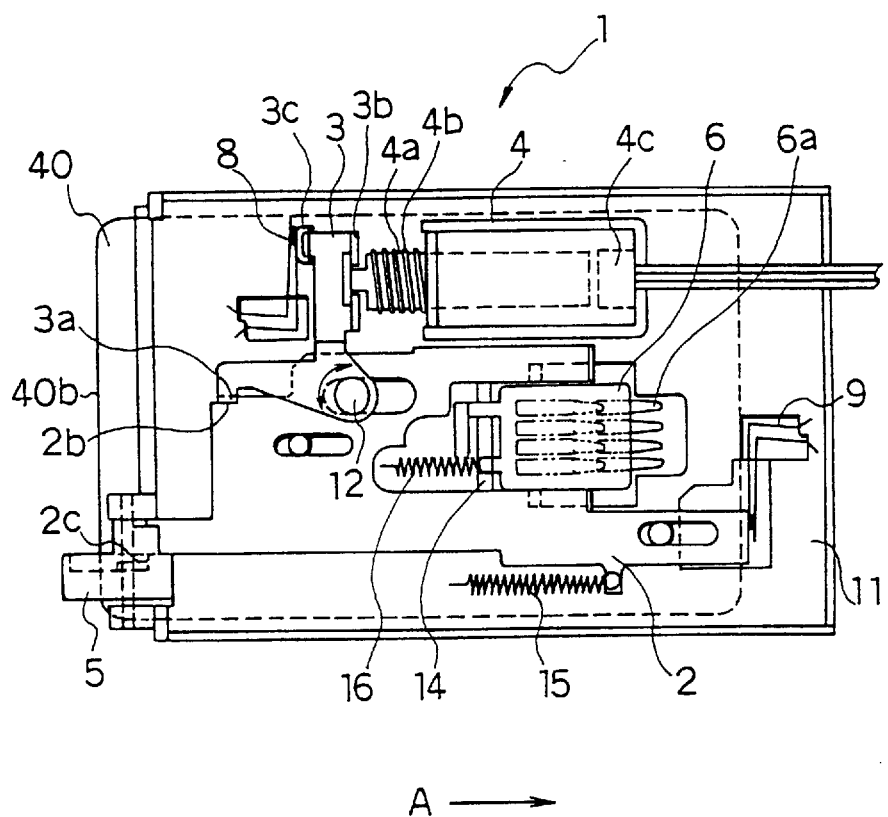
FIG. 13 is a plan view showing a state after the IC card is inserted in an IC card device of a second embodiment of the present invention.

FIG. 13 is a plan view showing a state after the IC card is inserted in an IC card device of a second embodiment of the present invention. In this embodiment, in the structure of the IC card device 1, a card detector 9 of a leaf switch type is disposed instead of the optical card detector. Since the structure is otherwise similar to that of the first embodiment, a redundant description on similar aspects will be simply omitted. A major difference from the first embodiment is that the card detector 9 of a leaf switch type is disposed which operates when pressed by the IC card contacting portion 2a of the card discharging member 2 so as to detect the insertion of the IC card 40 at the reading position.

As shown in FIG. 13, the card detector 9 is not disposed in the vicinity of the insertion opening 10a (FIG. 5), but is disposed at a position where the card detector 9 operates when pressed by the IC card contacting portion 2a of the card discharging member 2 upon arrival of the IC card 40 at the reading position. As a result, as in the first embodiment, it is possible to energize the electromagnetic solenoid 4 in response to an output signal from the card detector 9 and to latch the IC card 40. Hence, during the power failure, the IC card 40 is not latched but automatically discharged.

In the IC card device 1 according to this embodiment, since the card detector 9 is disposed in the insertion direction of the IC card 40, the size of the IC card device is reduced than that of the first embodiment where the optical card detector is disposed in the vicinity of the insertion opening 10a.

Third Embodiment

Figure 14:
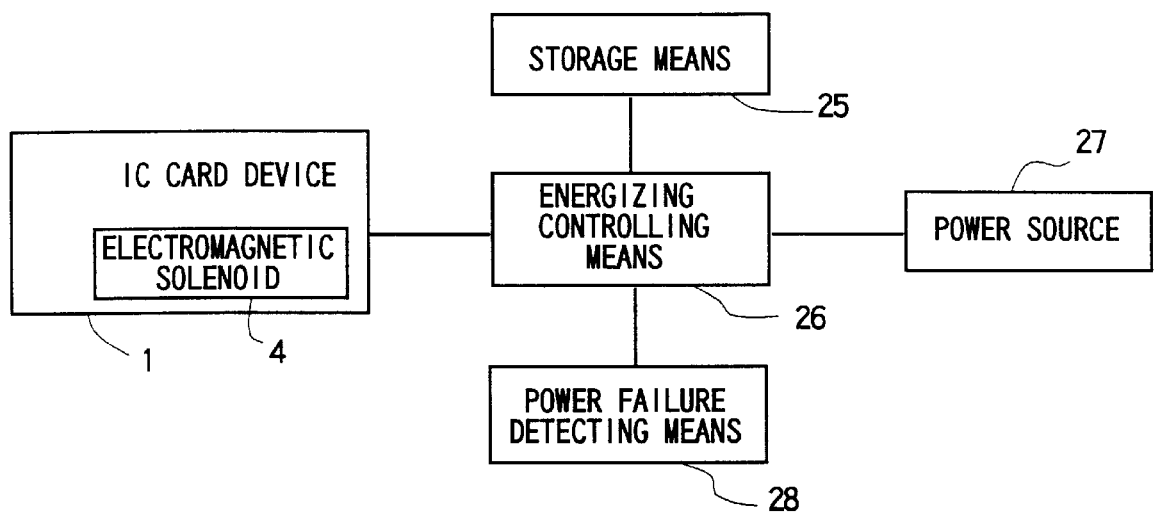
FIG. 14 is a block diagram showing a structure of an IC card device of a third embodiment of the present invention.

FIG. 14 is a block diagram showing a structure of an IC card device of a third embodiment of the present invention. An IC card device 1 according to this embodiment comprises storage means 25 for storing electric power, energizing controlling means 26 for controlling energizing of the electromagnetic solenoid 4, a power source 27 for supplying a current to the electromagnetic solenoid 4, and power failure detecting means 28 which detects that the power source 27 stops supplying. Since the structure is otherwise similar to that of the first embodiment, a redundant description on similar aspects will be simply omitted. A major difference from the first embodiment is that when the power failure detecting means 28 detects that the power source 27 stops supplying, using electric power which is stored in the storage means 25, the energizing controlling means 26 supplies a current to the electromagnetic solenoid 4.

In FIG. 14, the energizing controlling means 26 which controls energizing of the electromagnetic solenoid 4 is connected to the storage means 25 formed by a capacitor, a secondary battery or the like, to the power source 27 which supplies a current to the electromagnetic solenoid 4, and to the power failure detecting means 28 which detects that the power source 27 stops supplying. When the power source 27 is in the normal condition, as in the first embodiment, the energizing controlling means 26 controls energizing of the electromagnetic solenoid 4. Further, if abnormality occurs in the power source 27 and supply from the power source 27 is stopped with the IC card 40 still inserted into the IC card device 1, the power failure detecting means 28 detects that supply from the power source 27 is stopped. Thereby, using electric power stored in the storage means 25, the energizing controlling means 26 energizes the electromagnetic solenoid 4, so that the plunger 4a (FIG. 1) is sucked, and the IC card 40 is discharged.

In this manner, even if the power failure occurs with the IC card 40 still inserted into the IC card device 1, the IC card 40 is automatically discharged, so that the user can take back the IC card 40.

Although the present invention has been described in terms of the presently preferred embodiments, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

As has been described in the above, the IC card device of the present invention uses the electromagnetic solenoid of the self-holding type to drive the discharge-deterring member. Thereby, in the state before the IC card is inserted, the discharge-deterring member is fixed by the electromagnetic solenoid. Further, in the state after the card detector detects the insertion of the IC card, the electromagnetic solenoid allows the discharge-deterring member to operate so as to deter the operation of the card discharging member.

Therefore, in a normal condition where it is possible to energize the electromagnetic solenoid, it is possible to latch the IC card so that the IC card 40 is not pulled out while inserted.

Further, in an abnormal condition such as the power failure, the system abnormality or the like, since the electromagnetic solenoid is not energized, the discharge-deterring member does not deter the operation of the card discharging member. As a result, the IC card is not latched but automatically discharged.

Further, since the cam mechanism of the card holding member and the card discharging member is disposed, and the card holding member is operated in accordance with the operation of the card discharging member, the latching mechanism for the IC card is simple.

Furthermore, the storage means is disposed, the power failure detecting means is disposed, and the energizing controlling means is disposed which energizes the electromagnetic solenoid by using electric power stored in the storage means when the power failure detecting means detects the power failure. Thereby, in the case of the power failure during the insertion of the IC card, using the electric power stored in the storage means, the energizing controlling means can energize the electromagnetic solenoid, whereby the user can easily pull out the IC card by automatically discharging the IC card.

What is claimed is:

1. An IC card device, comprising:

card discharging means for discharging an IC card;

discharge-deterring means which is provided with a discharge-deterring member and driving means, when supplied with a first current, said discharge-deterring member deterring a discharging operation of discharging said IC card which is performed by said card discharging means, said driving means driving said discharge-deterring member;

detecting means for detecting insertion of said IC card and for supplying said first current to said discharge-deterring means upon said insertion of said IC card;

holding means for holding the inserted IC card at an insertion complete position when said discharging operation of discharging said IC card which is performed by said card discharging means is prohibited; and connection means which is electrically connected to a contact of said IC card, said detecting means being disposed in the vicinity of an insertion opening.

2. An IC card device, comprising:

card discharging means for discharging an IC card;

discharge-deterring means which is provided with a discharge-deterring member and driving means, when supplied with a first current, said discharge-deterring member deterring a discharging operation of discharging said IC card which is performed by said card discharging means, said driving means driving said discharge-deterring member, said driving means releasing deterrence of said discharging operation which is performed by said card discharging means at receipt of a second current;

a power source for supplying said first current and said second current to said driving means;

storage means for storing electric power;

energizing controlling means for switching a current supply condition to said discharge-deterring means;

holding means for holding said IC card inserted at an insertion complete position when said discharging operation which is performed by said card discharging means is deterred by said discharge-deterring means;

connection means which is electrically connected to a contact of said IC card, said energizing controlling means supplying electric power stored in said storage means to said discharge-deterring means as said second current when current supply from said power source is stopped.

3. The IC card device of claim 2, wherein said driving means is an electromagnetic solenoid of a self-holding type which sucks said discharge-deterring member to release deterrence of said discharging operation which is performed by said card discharging means at receipt of a second current and keeps sucking said discharge-deterring member until receipt of said first current.

4. The IC card device of claim 3, wherein said electromagnetic solenoid includes a plunger which is engaged with said discharge-deterring member, a first electromagnetic coil which is disposed around said plunger and receives said first current and said second current, and a magnet which keeps sucking after sucking said plunger.

5. The IC card device of claim 2, wherein comprising card detecting means for detecting insertion of said IC card, so that said first current is supplied to said discharge-deterring means when said card detecting means detects insertion of said IC card.

6. The IC card device of claim 2, wherein said card detecting means is disposed in the vicinity of an insertion opening.

7. The IC card device of claim 2 comprising the power failure detecting means for detecting that supply of electric power to said power source is stopped, said power failure detecting means controlling said energizing controlling means when detecting the supply is stopped.

8. An IC card device, comprising:

a card discharging member which is moved in an insertion direction of inserting an IC card together with said IC card;

a discharge-deterring member which deters an operation of said card discharging member when said IC card arrives at an insertion complete position;

a connection member which is electrically connected to a contact point of said IC card when said IC card arrives at an insertion complete position;

a card holding member which is revolved in association with said card discharging member to hold a rear edge of said IC card which is inserted; and a cam mechanism which revolves said card discharging member against said card holding member and said card discharging member.

* * * * *